March 9, 1926.

R. A. HOPF 1,576,325

CONVERTIBLE CART

Filed March 13, 1924

INVENTOR
Rudolph A. Hopf.
BY
ATTORNEY

March 9, 1926. 1,576,325
R. A. HOPF
CONVERTIBLE CART
Filed March 13, 1924 2 Sheets-Sheet 2

INVENTOR
Rudolph A. Hopf.
BY
W. P. Hutchinson,
ATTORNEY

Patented Mar. 9, 1926.

1,576,325

UNITED STATES PATENT OFFICE.

RUDOLPH A. HOPF, OF NEW YORK, N. Y., ASSIGNOR TO AVERILL MANUFACTURING CORPORATION, OF NEW YORK, N. Y., A CORPORATION OF NEW YORK.

CONVERTIBLE CART.

Application filed March 13, 1924. Serial No. 699,101.

*To all whom it may concern:*

Be it known that I, RUDOLPH A. HOPF, a citizen of the United States, and a resident of the city, county, and State of New York, have invented an Improvement in Convertible Carts, of which the following is a specification.

My invention relates to improvements in convertible carts, cradles, and the like, such as are primarily intended for use in connection with dolls, although the structure may be used for any suitable purpose. One particular object of my invention is to produce a structure which can be readily converted into either a cart or cradle, although other forms of supports than wheels or rockers may be used in connection with the invention.

Heretofore in making convertible baby or doll carriages, carts, cradles, and the like, the structures have been too complicated, and therefore likely to get out of order quickly with the rough usage given them, and moreover, they have been expensive. My invention is intended to overcome these difficulties, and produce an exceedingly simple and relatively strong structure which can be easily and cheaply made, and which will have the desirable characteristics of more expensive things, besides eliminatiing the disadvantages above noted. In the preferred form of my invention, I make the body which can be adapted for a cart, cradle, bed, or the like, preferably in skeleton form, and of suitably shaped wire, with sockets at the upper and lower parts and at the end portions, these being spaced apart. The bottom part or support can be a wheeled member or rocker, or other form of support, and this I make with a skeleton shank or framework which is adapted to enter the spaced sockets, and which therefore will render the structure exceedingly stiff, though very cheap and simple. In connection with the foregoing I can use a spring catch or other simple means of preventing the upper and lower parts of the structure from being easily separated. All of which will be better understood from the description which follows.

Reference is to be had to the accompanying drawings forming a part of this specification, in which similar reference characters indicate corresponding parts in all the views.

Figure 1:
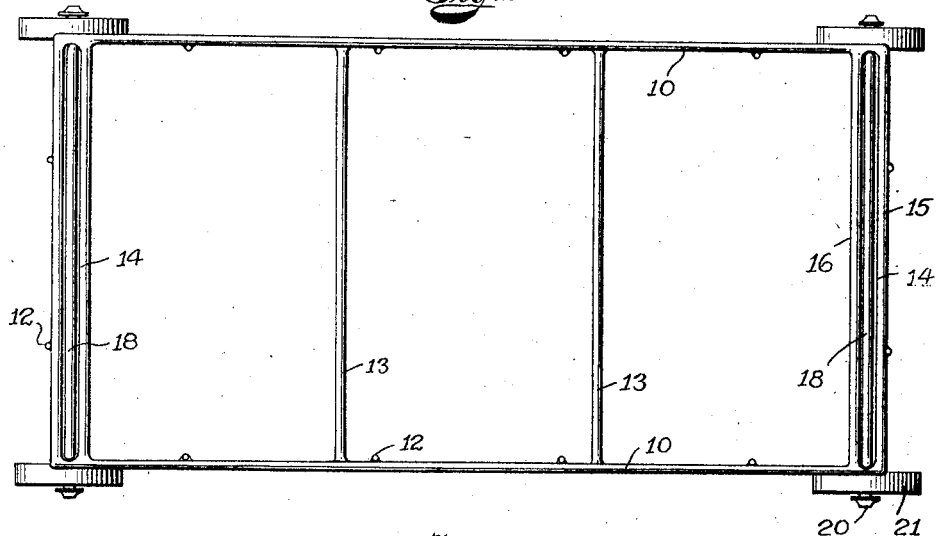
Figure 1 is a plan view of the structure embodying my invention showing it adapted for use as a cart.

The drawings are by way of example and show a simple means of carrying my invention into effect. As illustrated, a skeleton body is made, having upper and lower rectangular rails or frames 10 and 11 which are united by vertical spaced rods 12 at the sides and ends, and the bottom is formed of cross slats 13, all the aforesaid members being preferably made of wire, and the parts 12 and 13 may be secured to the members 10 and 11 in any convenient way. The above forms a simple and cheap body which is attractive in appearance, but the structure of the body is not important.

At the end portions of the body and at the upper and lower parts thereof, are sockets 14 there being two at each end, one above the other, and these are transversely arranged, and can be conveniently formed between the parallel cross rails 15 and 16 at the body ends, and as stated at top and bottom of the body. These sockets are therefore adapted to receive the shanks of the supporting members of the body each of which is preferably a generally rectangular framework formed of the side posts 17 and the connecting top rail 18, these parts being preferably integral and of wire.

Figure 2:
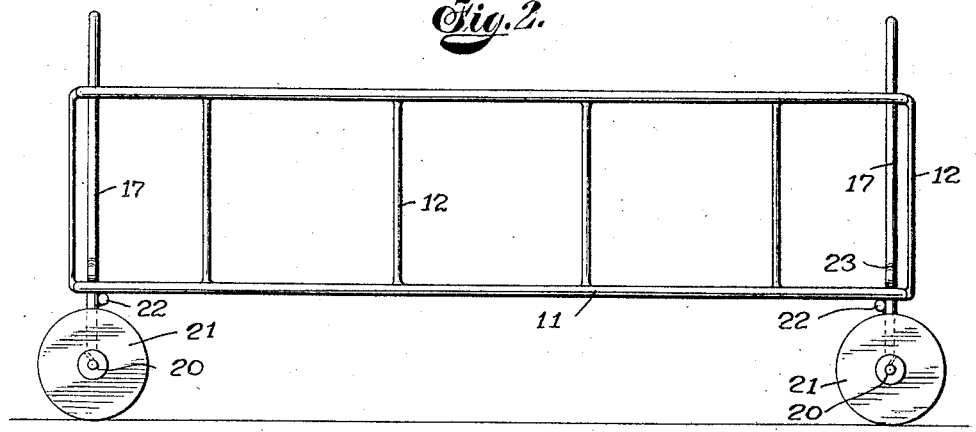
Figure 2 is a side elevation of the structure shown in Figure 1.
Figure 3:
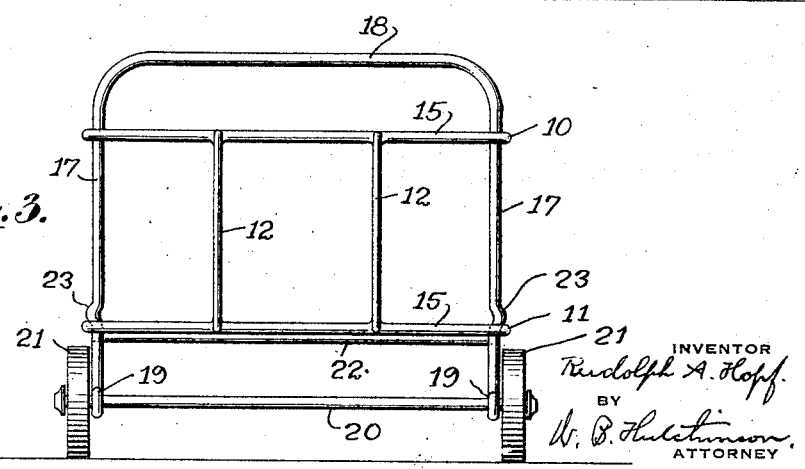
Figure 3 is an end view thereof.

As shown in Figures 1 to 3, the side members or posts 11 can be turned up to form rings or journals 19 for an axle 20, on which are wheels 21, thus forming a wheeled member. To brace the shank formed of the parts 17 and 18 a cross brace 22 near the bottom can be used which will prevent the members 17 from spreading or springing together.

As a convenient means of securing the shank, the side members 17 may be bent out slightly as shown at 23, thus forming bosses which are located so that when the shank is pushed up to the desired extent, the bosses will spring past the end wall of the socket 14 and prevent the shank from slipping out too easily, while the cross piece or brace 22 will prevent the body from dropping down into contact with the wheels. Thus it will be seen that the structure described is very simple, and the wheeled part can be separated from the body by simply pulling out the shanks from the sockets 14. It will be noticed that as the sockets 14 are at the end portions of the body and spaced apart vertically, and that the shank of the supporting member extends through both sockets, a very simple and stiff arrangement is provided.

Figure 4:
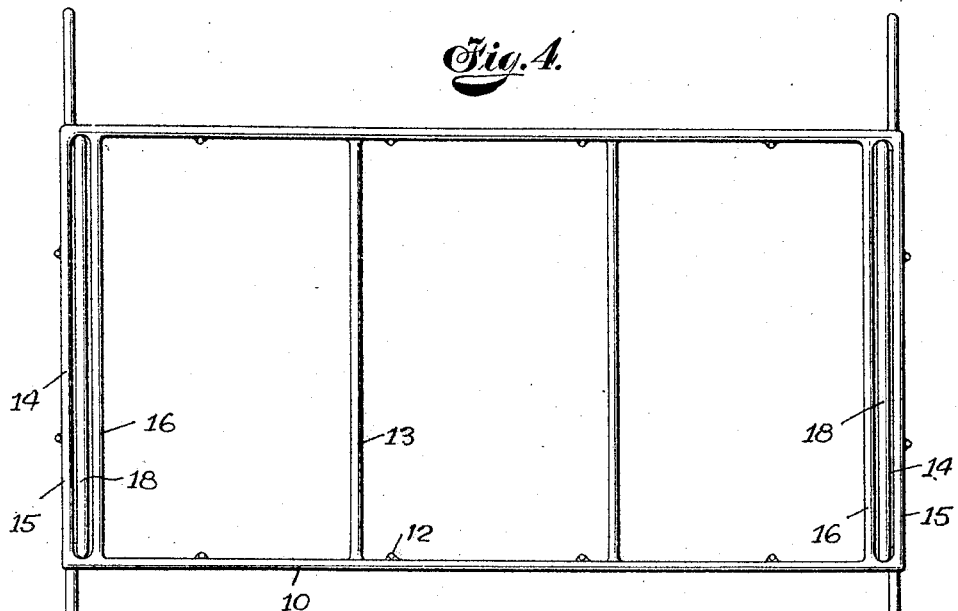
Figure 4 is a plan view of the structure when used as a cradle.
Figure 5:
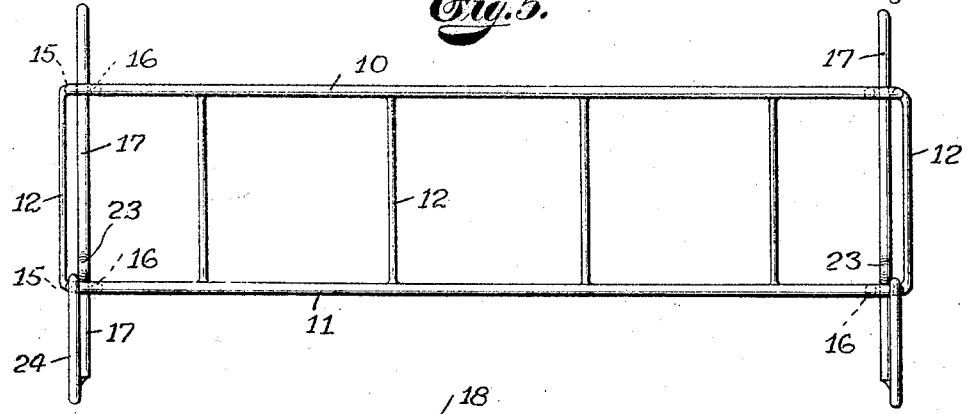
Figure 5 is a broken side elevation of the construction shown in Figure 4.
Figure 6:
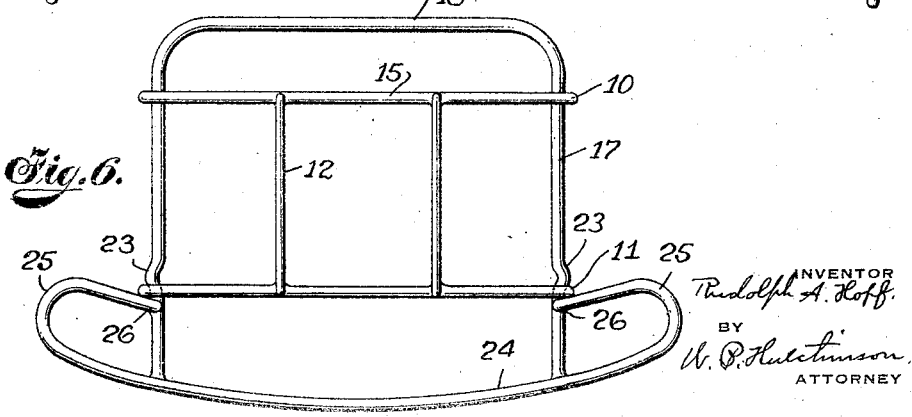
Figure 6 is an end view of the structure shown in Figure 4.

In Figures 4 to 6 I have shown the supporting members of the body rockers instead of wheeled members. In this structure the posts 17 are extended downward and fastened to the rocker member 24, which is turned over at the ends as shown at 25 in Figure 6, and the end portion of the wire which forms the rocker can be secured to the posts 17 as shown at 26.

The most ordinary uses of this structure are for a cart and cradle, but from the description which I have given it will be evident that the supports for the body may be something other than either wheels or rockers, without affecting the invention, the essential thing of which is to have the means for simply and securely, and at the same time detachably connecting the supporting members with the body of the device.

The structure which I have described can be most cheaply and conveniently made from wire and in skeleton form as described; but it will be understood that the design of the structure can be varied greatly, and that the body part need not be of skeleton structure so far as the invention is concerned.

I claim:—

1. A structure of the kind described comprising a body having vertically spaced flattened sockets extending for a substantial distance transversely thereof, and supports detachably connected to the body having shanks to fit the said sockets.

2. A structure of the kind described comprising a body having at each of the end portions thereof a pair of vertically spaced flattened sockets extending transversely of the body, and detachable supports for the body, each support having a shank fitting detachably in both sockets at the corresponding end of the body.

3. A structure of the kind described having at the end portions thereof vertically spaced sockets extending substantially across the body, and supporting members having shanks fitting in said sockets, the shanks of each member extending through both sockets at the corresponding end of the body.

4. A structure of the kind described comprising a skeleton body having at each end and at the upper and lower parts transverse sockets extending substantially across the body, and detachable members or supports having generally rectangular shanks, each shank extending through both sockets at one end of the body.

5. A structure of the kind described comprising a body having vertically spaced transversely extending sockets at the end portions thereof, supporting members having shanks to enter and fit the aforesaid sockets, and spring catches to hold the shanks in their sockets.

6. A skeleton body having transverse sockets at the ends and with the sockets at each end vertically spaced, and supporting members having generally rectangular shanks with bosses in the side members thereof adapted to spring past the end walls of one of the sockets and fasten the shank in its socket.

In testimony whereof, I have signed my name to this specification this 3rd day of March, 1924.

RUDOLPH A. HOPF.